United States Patent [19]

Tuck et al.

[11] 3,753,048

[45] Aug. 14, 1973

[54] MULTI-CHANNEL ELECTRICAL CONNECTOR

[75] Inventors: George Tuck, Leucadia; Everett R. Price, Escondido; John E. Oakley, Encinitas, all of Calif.

[73] Assignee: Teledyne, Inc., Los Angeles, Calif.

[22] Filed: Nov. 22, 1971

[21] Appl. No.: 201,062

Related U.S. Application Data

[63] Continuation-in-part of Ser. No. 147,481, May 27, 1971, abandoned.

[52] U.S. Cl. .................... 317/101 DH, 339/176 MP

[51] Int. Cl. .................... H02b 1/02

[58] Field of Search .............. 317/101 CC, 101 DH; 339/17 LC, 17 LM, 17 M, 176 MP

[56] References Cited

UNITED STATES PATENTS

| | | | |
|---|---|---|---|
| 2,956,141 | 10/1960 | Smith | 317/101 DH |
| 3,591,834 | 7/1971 | Kolias | 317/101 DH |
| 3,270,311 | 8/1966 | Deer et al. | 339/17 M |
| 3,215,968 | 11/1965 | Herrmann | 339/176 MP |

*Primary Examiner*—David Smith, Jr.
*Attorney*—Ronald W. Reagin et al.

[57] ABSTRACT

An electrical connector is disclosed which includes an insulative body having a first surface, a second surface and a third surface whose plane intersects the plane of the first and second surfaces. An interconnecting module is provided which includes an insulative support member and a plurality of resilient electrically conductive contact members. Each of these contact members includes a first end portion, a central portion and a second end portion. The central portion of each of the contact members is embedded in the support member such that each of the contact members is supported in spaced parallel relation relative to the other contact members. The support member is secured to the third surface of the insulative body so that the first end portion of each of the contact members is positioned in one of a first plurality of grooves in the first surface and extends resiliently through the first surface and the second end portion of each of the contact members is positioned in a corresponding one of a second surface and extends resiliently through the second surface.

8 Claims, 7 Drawing Figures

GEORGE TUCK
EVERETT R. PRICE
JOHN E. OAKLEY
INVENTORS
BY
ATTORNEY

GEORGE TUCK
EVERETT R. PRICE
JOHN E. OAKLEY

INVENTORS

BY Ronald W Reagan

ATTORNEY

MULTI-CHANNEL ELECTRICAL CONNECTOR

This application is a continuation-in-part of application Ser. No. 147,481, filed: May 27, 1971, now abandoned.

This invention relates to electrical connectors, and more particularly to an improved multi-channel electrical connector for making electrical connections between two series of electrical conductors on two printed circuit boards or the like.

There is a type of printed circuit connector well known to those skilled in the art which consists essentially of an elongated body of insulative material which usually has a square or rectangular cross-section. The body includes a plurality of circumferential grooves usually extending all the way around the body. A plurality of resilient electrically conductive contact members are provided, with each contact member being positioned around the body of the connector in a respective one of the aforementioned grooves. Each contact member is bent so that some portions of it normally project out of its groove and above the surfaces of the connector body. When the connector is secured against a printed circuit board, the printed circuit board depresses the contact member downwardly into its channel, but the spring action of the contact member exerts force on the circuit pads on the circuit board, thereby making positive, low resistance connections with the circuit board. Typical of such connectors are the ones shown and described in the U.S. Pat. No. 3,173,732.

Such connectors have proven to be quite satisfactory for use in many applications. However, in these connectors, each of the contact members must be inserted individually into its respective channel in the body of the connector. There are many applications in which it would be desirable to provide a contact structure in which many such contact members could be inserted into their respective grooves simultaneously in a single assembly operation. In addition, such connectors can only be used to interconnect series of electrical conductors on printed circuit boards in which the boards are mounted so that the interconnected conductors are in opposed or facing relations. There are many applications where it would be desirable to use such efficient, low cost connectors to interconnect electrical conductors on two printed circuit boards which are mounted such that the conductive portions of the printed circuit boards are facing in the same direction, and thus the front of one circuit board is opposed to the back of the other circuit board.

It is accordingly an object of the present invention to provide an improved electrical connector for interconnecting circuit boards or the like.

It is yet another object of the present invention to provide an improved electrical connector for interconnecting circuit boards in which a plurality of contact members can be simultaneously secured to the connector body.

It is yet another object of the present invention to provide an improved electrical connector which can be used to interconduct series of electrical conductors on two printed circuit boards which are mounted so that the electrical conductors are facing the same direction.

Briefly stated, and in accordance with the presently preferred embodiment of this invention, an electrical connector for interconnecting two series of electrical conductors or printed circuit boards or the like is provided which includes an insulative body having a first surface adapted to be secured against a first series of electrical conductors, a second surface adapted to be secured against a second series of electrical conductors and a third surface whose plane intersects the plane of the first and second surfaces. A first plurality of grooves is provided in the first surface and a second plurality of grooves is provided in the second surface each of which corresponds to a respective one of the first plurality of grooves. An interconnecting module is provided which includes an insulative support member and a plurality of resilient electrically conductive contact members. Each of these contact members includes a first end portion, a central portion and a second end portion. The central portion of each of the contact members is embedded in the support member such that each of the contact members is supported in spaced parallel relation relative to the other contact members. Means are provided to secure the support member to the third surface of the insulative body so that the first end portion of each of the contact members is positioned in a respective one of the first plurality of grooves and extends resiliently through the first surface and the second end portion of each of the contact members is positioned in the corresponding one of the second plurality of grooves and extends resiliently through the second surface.

For a complete understanding of the invention and an appreciation of its other objects and advantages, please refer to the following detailed description of the attached drawings, in which.

Figure 1:
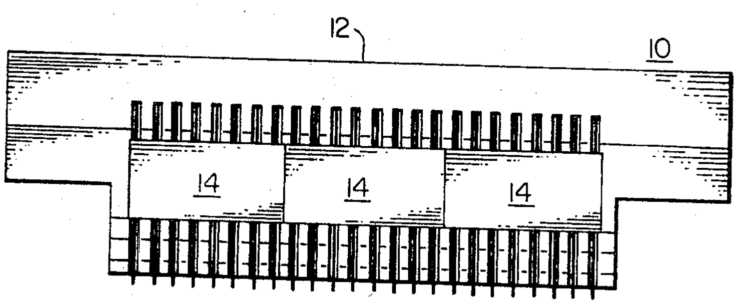
FIG. 1 shows a plan view of an electrical connector in accordance with the present invention.

FIG. 1 shows a plan view of an electrical connector 10 in accordance with the present invention. The connector 10 includes an elongated body 12 of insulative material and a plurality of interconnecting modules 14 which complete the electrical connections between a first series of electrical conductors and a second series of electrical conductors, which are not shown in FIG. 1. The figure shows three such modules 14, but any desired number from one upward of such modules may be used with the invention.

Figures 2, 3:
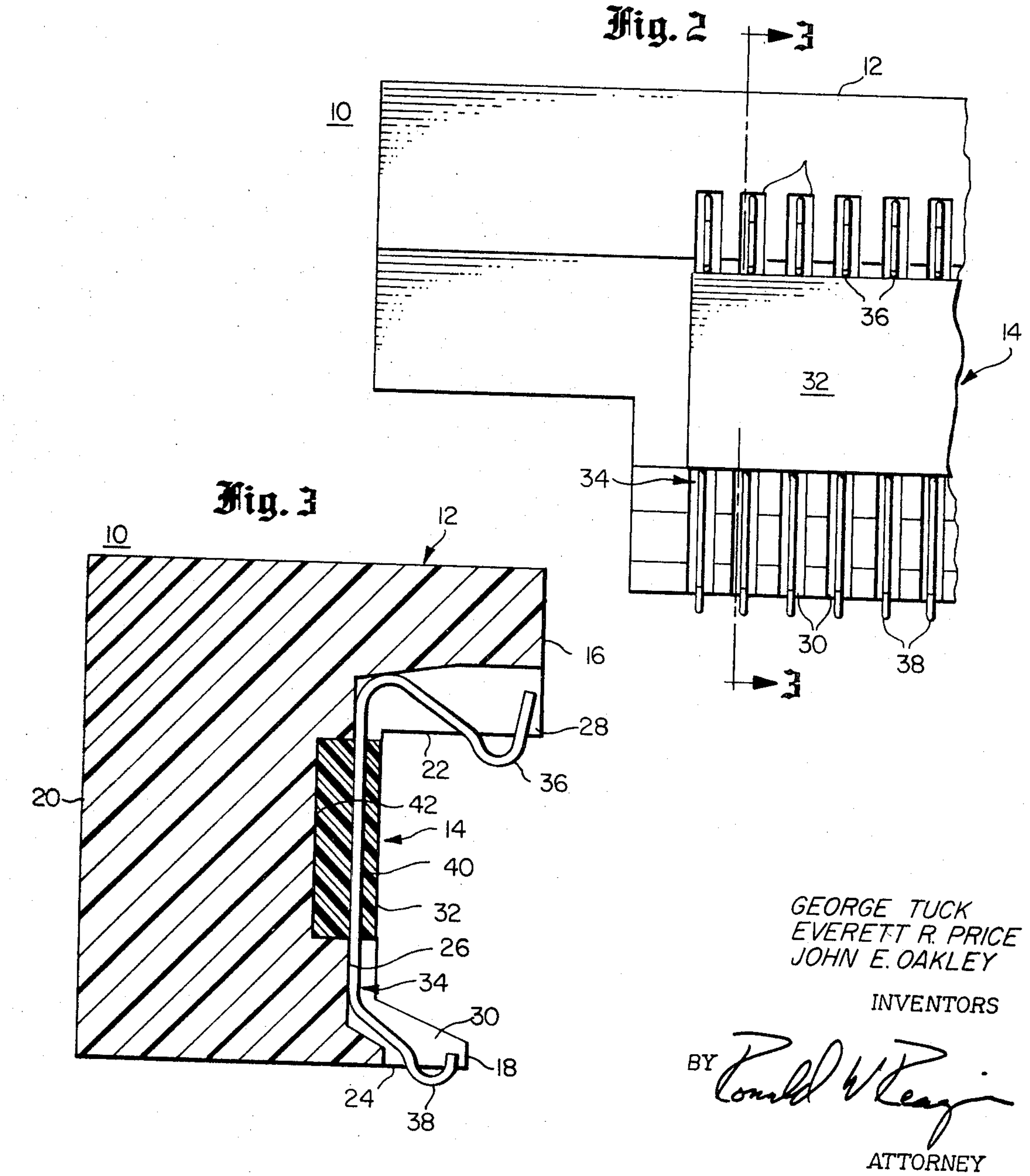
FIG. 2 shows an enlarged detailed view of a portion of the connector of FIG. 1.
FIG. 3 shows a sectional view taken along the lines 3—3 in FIG. 2.

The structural details of the present invention are better shown in FIGS. 2 and 3. FIG. 2 is an enlarged view of the left-hand portion of FIG. 1 and FIG. 3 is a sectional view taken along the lines 3—3 in FIG. 2. The following description is of FIGS. 2 and 3 simultaneously.

The insulative body 12 has a generally C shaped cross-section which includes upper and lower generally parallel sections 16 and 18 respectively and a central section 20 interconnecting the upper section 16 and lower section 18. A first surface 22 is formed by the inner surface of upper section 16, a second surface 24 is formed by the outer surface of lower section 18 and a third surface 26 is formed by the inner surface of central section 20. A first plurality of parallel grooves 28 is provided in first surface 22 and a second plurality of parallel grooves 30 is provided in surface 24 each of which corresponds to a respective one of the first plurality of grooves 28.

In accordance with one of the features of the present invention, an interconnecting module 14 is provided which includes an insulative support member 32 and a plurality of resilient electrically conductive contact members 34. Each of the contact members 34 includes a first end portion 36, a second end portion 38 and a central portion 40. As is shown in FIG. 3, the central portion 40 of each of the contact members 34 is embedded in support member 32, which supports each of the contact members 34 in spaced parallel relation relative to the others of the contact members 34.

The support member 32 of interconnecting module 14 is secured to the third surface 26 so that the first end portion 36 of each of the contact members 34 is positioned in a respective one of the first plurality of grooves 28 and extends resiliently through first surface 22. Similarly, the second end portion 38 of each of the contact members 34 is positioned in the corresponding one of the second plurality of grooves 30 and extends resiliently through the second surface 24. In the preferred embodiment of the invention illustrated in the drawings, support member 32 is secured to third surface 26 by providing a depression 42 in third surface 26 whose interior surfaces conform to the exterior surfaces of support member 32. Support member 32 is then retained in this depression by a friction fit. This allows connector 10 to be quickly and economically assembled in a positive manner during the manufacturing operation. Alternatively, support member 32 could be secured to third surface 26 by any suitable manner, such as by a suitable cement, by bolts, clips or any other desired manner.

Figures 4, 5:
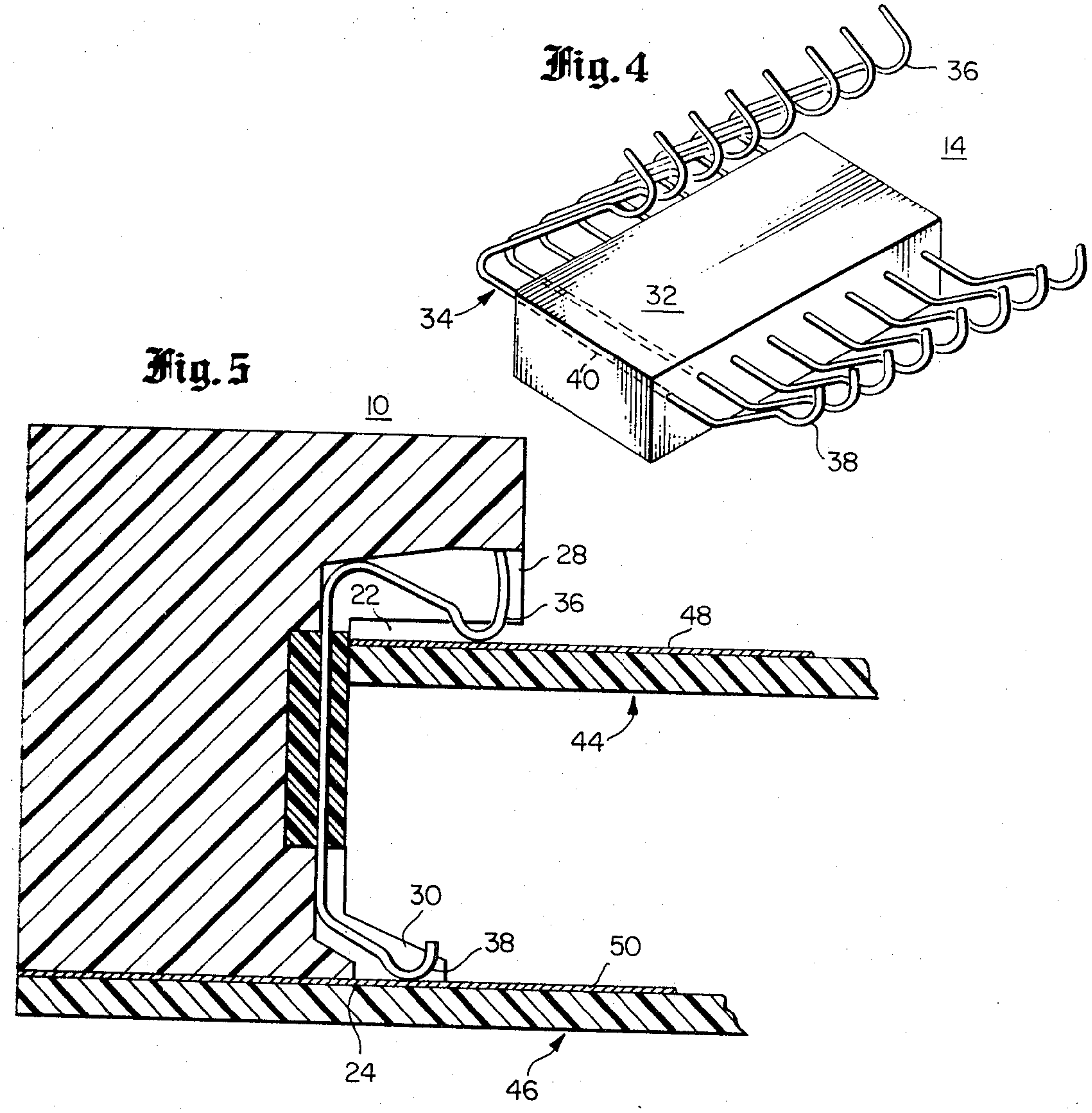
FIG. 4 shows a perspective view of the interconnecting module of the connector of FIGS. 1 through 3.
FIG. 5 shows a cross-sectional view similar to that of FIG. 3 but shows the connector interconnecting electrical conductors on two printed circuit boards.

FIG. 4 shows a perspective view of the interconnecting module 14 of FIGS. 1 through 3 and better illustrates how the central portions 40 of each of the contact members 34 is embedded in insulative support member 32 in such a manner that the contact members 34 are supported in spaced parallel relation to each other.

The connector 10 of FIGS. 1 through 3 is intended to make electrical connection between a first series of electrical conductors on a printed circuit board or the like which is secured adjacent to first surface 22 and a second series of electrical conductors on a second printed circuit board or the like which is secured against second surface 24. FIG. 5 shows a cross-sectional view similar to FIG. 3 but in which a first printed circuit board 44 is secured by any suitable means (not shown in the figure) against the first surface 22 of connector 10 and a second printed circuit board 46 is secured against the second surface 24 of connector 10. One of a first series of electrical conductors 48 on the top surface of first printed circuit board 44 contacts the first end 36 of contact member 34 and depresses it downward into first groove 28. The natural resilience of the first end 36 of contact member 34 causes it to press firmly back against electrical conductor 48 at this time. Similarly, one of a second series of electrical conductors 50 on the top surface of printed circuit board 46 depresses the second end portion 38 of contact member 34 down into the groove 30 in second surface 24. Again, the natural resilience of the contact member 34 causes it to press back against the electrical conductor 50 to assure good electrical contact therewith. Thus, as is shown in FIG. 5, the contact member 34 completes a good electrical connection between electrical conductor 48 on printed circuit board 44 and electrical conductor 50 on printed circuit board 46.

This feature of the present invention thus provides electrical connection between two series of electrical conductors on the sides of printed circuit boards which are facing in the same direction. Many such connectors of the prior art have been limited to providing electrical interconnections between printed circuit boards on which the conductors are printed on opposed or facing sides.

Figure 6:
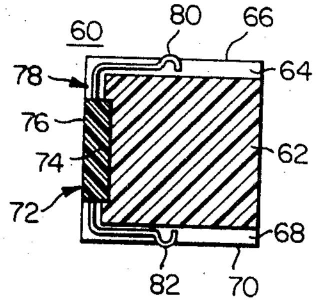
FIG. 6 shows a cross-sectional view of an electrical connector incorporating a second embodiment of the invention.

FIG. 6 shows a cross-sectional view of an electrical connector 60 incorporating a second embodiment of the present invention. The connector 60 of FIG. 6 is intended to interconnect series of electrical conductors on opposed or facing printed circuit boards (not shown in the figure). Such connectors are known to those skilled in the art as 180° connectors.

In the device of FIG. 6, the connector 60 includes an elongated body 62 of insulative material having a generally rectangular or square cross-section. A first plurality of grooves 64 is provided in a first surface 66 of the body 62 and a second plurality of grooves 68 each corresponding to a respective one of the first grooves 64 is provided in the second or opposed surface 70 of the body 62. An interconnecting module 72 is provided which is secured in a depression in the third surface 74 of the body 62. The plane of the third surface 74 intersects the first and second surfaces 66 and 70 respectively. A plurality of resilient electrically conductive contact members 78 are supported in spaced parallel relation relative to each other by the insulative support member 76 of module 74. Each of the contact members 78 includes a first end portion 80 positioned in one of the first grooves 64 and a second end portion 82 positioned in the corresponding second groove 68. First end portion 80 of contact member 78 extends resiliently through the first surface 66 and the second end portion 82 extends resiliently through second surface 70. The electrical connector 60 thus serves to interconnect two printed circuit boards in the same manner as does the prior art 180° connectors.

Figure 7:
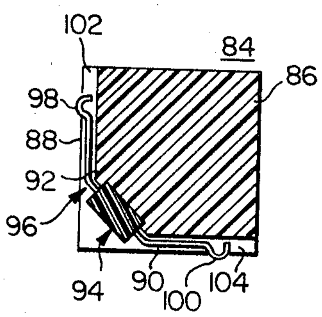
FIG. 7 shows a cross-sectional view of an electrical connector incorporating a third embodiment of the invention.

FIG. 7 shows a cross-sectional view of an electrical connector 84 which incorporates a third embodiment of the invention. The embodiment of FIG. 7 is generally similar to the embodiment shown in FIG. 6 except that the connector 84 is the type of connector known to those skilled in the art as a 90° connector. Such connectors are used to interconnect series of electrical conductors on two printed circuit boards or the like which are positioned at substantially right angles to each other. The connector 84 comprises an elongated insulative body 86 having a generally rectangular or square cross-section and having a first surface 88 on one side thereof and a second surface 90 which is adjacent to and intersects first surface 88. A third surface 92 is provided in body 86 which intersects the surfaces 88 and 90. In this embodiment, the interconnecting module 94, which is generally similar to the interconnecting module 72 of FIG. 6, is secured in a depression in third surface 92, and supports a plurality of resilient electrically conductive contact members 96 in spaced parallel relation relative to each other. Each of the contact members 96 includes a first end portion 98 and a second end portion 100 positioned respectively in grooves 102 and 104 in first and second surfaces 88 and 90 respectively. Again, as will be appreciated by those skilled in the art, the connector 84 is used in the same manner as prior art conventional 90° connectors.

While the invention is thus disclosed and several embodiments described in detail, it is not intended that the invention is limited to these shown embodiments. Instead, many modifications will occur to those skilled in the art which lie within the spirit and scope of the invention. Accordingly, it is intended that the invention be limited in scope only by the appended claims.

What is claimed is:

1. An electrical connector for interconnecting two series of electrical conductors on printed circuit boards or the like, comprising, in combination:

an insulative body including a first surface adapted to be secured adjacent a first series of electrical conductors, a second surface adapted to be secured adjacent a second series of electrical conductors and a third surface whose plane intersects the plane of said first and second surfaces;

said first surface including a first plurality of grooves therein;

said second surface including a second plurality of grooves therein each corresponding to a respective one of said first plurality of grooves;

an interconnecting module comprising an insulative support member and a plurality of resilient electrically conductive contact members, with each of said contact members including a first end portion, a central portion and a second end portion, and in which the central portion of each of said contact members is embedded in said support member such that each of said contact members is supported in spaced parallel relation relative to the others of said contact members; and means securing said support member to said third surface of said insulative body so that the first end portion of each of said contact members is positioned in a respective one of said first plurality of grooves and extends resiliently through said first surface and the second end portion of each of said contact members is positioned in the corresponding one of said second plurality of grooves and extends resiliently through said second surface.

2. The electrical connector of claim 1 in which said means securing said support member to said insulative body comprises a depression in said third surface whose internal surfaces conform to the external surfaces of said support member and means for retaining said support member in said depression.

3. The electrical connector of claim 2 in which said support member is retained in said depression in said third surface by a friction fit.

4. The electrical connector of claim 1 in which said insulative body has a generally C shaped cross-section including upper and lower generally parallel section and a central section interconnecting said upper and lower sections.

5. The electrical connector of claim 4 in which said first surface comprises the inner surface of said upper section of said insulative body, said second surface comprises the outer surface of said lower section of said insulative body and said third surface comprises the inner surface of said central section of said insulative body, whereby said connector can interconnect electrical conductors on two printed circuit boards which face the same direction.

6. The electrical connector of claim 5 in which said means securing said support member to said insulative body comprises a depression in said third surface whose internal surfaces conform to the external surfaces of said support member and means for retaining said support member in said depression.

7. The electrical connector of claim 6 in which said support member is retained in said depression in said third surface by a friction fit.

8. An electrical connector for interconnecting two series of electrical conductors on two printed circuit boards or the like which face the same direction, comprising, in combination:

an insulative body having a generally C shaped cross-section including upper and lower generally parallel sections and a central section interconnecting said upper and lower sections and having a first inner surface of said upper section adapted to be secured adjacent a first series of electrical conductors, a second outer surface of said lower section adapted to be secured adjacent a second series of electrical conductors and a third inner surface of said central section;

said first surface including a first plurality of grooves therein;

said second surface including a second plurality of grooves therein each corresponding to a respective one of said first plurality of grooves;

a plurality of resilient electrically conductive contact members each including a first end portion, a central portion and a second end portion; and means securing the central portion of said contact members to said third surface in such a manner that the first end portion of each of said contact members is positioned in a respective one of said first plurality of grooves and extends resiliently through said first surface and the second end portion of each of said contact members is positioned in the corresponding one of said second plurality of grooves and extends resiliently through said second surface.

* * * * *